United States Patent
Bartlett et al.

(10) Patent No.: US 7,313,922 B2
(45) Date of Patent: Jan. 1, 2008

(54) HIGH CONDUCTANCE CRYOPUMP FOR TYPE III GAS PUMPING

(75) Inventors: Allen J. Bartlett, Milford, MA (US); John Nordborg, Holden, MA (US); Brian Thompson, Lakeville, MA (US)

(73) Assignee: Brooks Automation, Inc., Chelmsford, MA (US)

( * ) Notice: Subject to any disclaimer, the term of this patent is extended or adjusted under 35 U.S.C. 154(b) by 337 days.

(21) Appl. No.: 10/948,955

(22) Filed: Sep. 24, 2004

(65) Prior Publication Data

US 2006/0064990 A1    Mar. 30, 2006

(51) Int. Cl.
*B01D 3/12*    (2006.01)
(52) U.S. Cl. ...................................................... 62/55.5
(58) Field of Classification Search ................. 62/55.5
See application file for complete search history.

(56) References Cited

U.S. PATENT DOCUMENTS

| | | | |
|---|---|---|---|
| 3,130,563 A | 4/1964 | Wood et al. | |
| 3,218,815 A | 11/1965 | Chellis et al. | |
| 3,584,440 A | 6/1971 | Vigil et al. | |
| 4,092,908 A | 6/1978 | Straitz, III | |
| 4,212,170 A * | 7/1980 | Winkler | 62/55.5 |
| 4,277,951 A | 7/1981 | Longsworth | |
| 4,285,710 A * | 8/1981 | Welch | 62/55.5 |
| 4,336,690 A * | 6/1982 | Welch | 62/55.5 |
| 4,356,701 A | 11/1982 | Bartlett et al. | |
| 4,444,717 A | 4/1984 | de Breze | |
| 4,449,373 A | 5/1984 | Peterson et al. | |
| 4,466,252 A | 8/1984 | Hood | |
| 4,494,381 A * | 1/1985 | Lessard | 62/55.5 |
| 4,530,213 A * | 7/1985 | Kadi | 62/55.5 |
| 4,555,907 A | 12/1985 | Bartlett | |
| 4,691,534 A * | 9/1987 | Lombardini et al. | 62/55.5 |
| 4,697,982 A | 10/1987 | Hooper | |
| 4,718,241 A * | 1/1988 | Lessard et al. | 62/55.5 |
| 4,791,791 A | 12/1988 | Flegal et al. | |
| 4,907,413 A | 3/1990 | Clarkson et al. | |
| 5,000,007 A | 3/1991 | Haefner | |
| 5,056,319 A * | 10/1991 | Strasser | 62/55.5 |
| 5,083,445 A | 1/1992 | Saho et al. | |
| 5,096,673 A | 3/1992 | Gammie et al. | |
| 5,156,007 A | 10/1992 | Bartlett et al. | |
| 5,183,567 A | 2/1993 | Mohn et al. | |
| 5,211,022 A * | 5/1993 | Bartlett et al. | 62/55.5 |

(Continued)

FOREIGN PATENT DOCUMENTS

DE    29 12 856 A1    10/1979

(Continued)

*Primary Examiner*—William C Doerrler
(74) *Attorney, Agent, or Firm*—Hamilton, Brook, Smith & Reynolds, P.C.

(57) ABSTRACT

A cryopump provides for high pumping speed of Type III gases. An open configuration of a frontal array provides high conductance of gases into a radiation shield which is shaped to focus gases toward a second stage array. The second stage array has an open configuration of baffles coated with adsorbent. Substantially all of the adsorbent has a direct line of sight to the radiation shield or to the opening in the radiation shield, and substantially all of the baffles are coated with adsorbent. In one form, the second stage cryopump array comprises an array of discs fanned to define a generally ball shaped envelope.

26 Claims, 10 Drawing Sheets

U.S. PATENT DOCUMENTS

| | | |
|---|---|---|
| 5,236,041 A | 8/1993 | Fay |
| 5,301,511 A * | 4/1994 | Bartlett et al. ............... 62/55.5 |
| 5,450,729 A | 9/1995 | Hilton |
| 5,483,803 A | 1/1996 | Matte et al. |
| 5,537,833 A | 7/1996 | Matte et al. |
| 5,542,257 A * | 8/1996 | Mattern-Klosson et al. . 62/55.5 |
| 5,782,096 A | 7/1998 | Bartlett et al. |
| 5,855,118 A | 1/1999 | Lorimer |
| 5,974,809 A | 11/1999 | Wooster et al. |
| 6,053,704 A | 4/2000 | Yamamoto et al. |
| 6,092,373 A | 7/2000 | Mundinger |
| 6,122,920 A | 9/2000 | Hill et al. |
| 6,122,921 A | 9/2000 | Brezoczky et al. |
| 6,155,059 A * | 12/2000 | Matte et al. ................. 62/55.5 |
| 6,241,793 B1 | 6/2001 | Lee et al. |
| 6,309,184 B1 | 10/2001 | Moraja et al. |
| 6,319,299 B1 | 11/2001 | Shih et al. |
| 6,330,801 B1 | 12/2001 | Whelan et al. |
| 6,488,745 B2 | 12/2002 | Gu |
| 2004/0131478 A1 | 7/2004 | O'Neil et al. |

FOREIGN PATENT DOCUMENTS

| | | |
|---|---|---|
| JP | 05-248341 A2 | 9/1993 |
| JP | 07 301178 A | 11/1995 |
| JP | 10-288553 A2 | 10/1998 |
| WO | WO 00/77398 A1 | 12/2000 |

* cited by examiner

HIGH CONDUCTANCE CRYOPUMP FOR TYPE III GAS PUMPING

BACKGROUND OF THE INVENTION

Cryopumps currently available, whether cooled by open or closed cryogenic cycles, generally follow the same design concept. A low temperature second stage array, usually operating in the range of 4-25 degrees K., is a primary pumping surface. This surface is surrounded by a high temperature cylinder usually operated in the temperature range of 40-130 degrees K., which provides radiation shielding to the lower temperature array. The radiation shield generally comprises a housing which is closed except at a frontal array positioned between the primary pumping surface and the chamber to be evacuated. This higher temperature, first stage, frontal array serves as a pumping site for high boiling point gases such as water vapor, known as Type I gases.

In operation, high boiling point gases such as water vapor are condensed on the frontal array. Lower boiling point gases pass through the frontal array and into the volume within the radiation shield. Type II gases, such as nitrogen, condense on the second stage array. Type III gases, such as hydrogen, helium and neon, have appreciable vapor pressures at 4K. To capture Type III gases, inner surfaces of the second stage array may be coated with an adsorbent such as charcoal, zeolite or a molecular sieve. Adsorption is a process whereby gases are physically captured by a material held at cryogenic temperatures and thereby removed from the environment. With the gases thus condensed or adsorbed onto the pumping surfaces, only a vacuum remains in the work chamber.

In systems cooled by closed cycle coolers, the cooler is typically a two stage refrigerator having a cold finger which extends through the radiation shield. The cold end of the second, coldest stage of the refrigerator is at the tip of the cold finger. The primary pumping surface, or cryopanel, is connected to a heat sink at the coldest end of the second stage of the cold finger. This cryopanel may be a simple metal plate, a cup or a cylindrical array of metal baffles arranged around and connected to the second stage heat sink as, for example, in U.S. Pat. No. 4,494,381, which is incorporated herein by reference. This second stage cryopanel may also support low temperature condensing gas adsorbents such as charcoal or zeolite as previously stated.

The refrigerator cold finger may extend through the base of a cup-like radiation shield and be concentric with the shield. In other systems, the cold finger extends through the side of the radiation shield. Such a configuration at times better fits the space available for placement of the cryopump.

The radiation shield is connected to a heat sink, or heat station, at the coldest end of the first stage of the refrigerator. This shield surrounds the second stage cryopanel in such a way as to protect it from radiant heat. The frontal array which closes the radiation shield is cooled by the first stage heat sink through the shield or, as disclosed in U.S. Pat. No. 4,356,701, which is incorporated herein by reference, through thermal struts.

Cryopumps need to be regenerated from time to time after large amounts of gas have been collected. Regeneration is a process wherein gases previously captured by the cryopump are released. Regeneration is usually accomplished by allowing the cryopump to return to ambient temperatures and the gases are then removed from the cryopump by means of a secondary pump. Following this release and removal of gas, the cryopump is turned back on and after re-cooling is again capable of removing large amounts of gas from a work chamber.

The practice of the prior art has been to protect the adsorbent material placed on the second stage cryopanel, e.g. by enclosing the second stage adsorbent with chevrons, to prevent condensing gases from condensing on and hence blocking the adsorbent layer. In this manner, the layer is saved for the adsorption of noncondensing gases such as hydrogen, neon, or helium. This reduces the frequency of regeneration cycles. The chevrons, however, decrease the accessibility of the non-condensables to the adsorbent.

A figure of merit of cryopumps is the capture probability of hydrogen, the probability that a molecule of hydrogen that reaches the open mouth of the cryopump from outside of the pump will be captured on the second stage of the array. The capture probability directly relates to the speed of the pump for hydrogen, the liters per second captured by the pump. Higher rate pumps of conventional design have a capture probability of hydrogen of 20% or greater.

Various pump designs have been proposed to increase the pumping speed of Type III gases. For example, U.S. Pat. No. 4,718,241, which is incorporated herein by reference, presents a second stage array designed to increase the speed for pumping the non-condensable gases, while at the same time limiting the frequency of regeneration of the system. It accomplishes this by opening up the second stage cryopanel to allow greater accessibility of the noncondensing gases, such as hydrogen, neon, or helium, to the adsorbent material which has been placed on the interior surfaces of the discs of the cryopanel. This allows the noncondensing gases to be adsorbed more quickly, thus increasing the pumping speed for the non-condensables. At the same time, the second stage array was designed so as to assure that all of the gas molecules first strike a surface of the cryopanel which has not been coated with an adsorbent material.

SUMMARY OF THE INVENTION

In certain applications such as ion implantation, Type II gases are not prevalent, and loading of the cryopump is dominated by Type III hydrogen gas. Recognizing that, the present designs are based on a lesser concern for capture of Type II gases and a lesser concern for protecting the adsorbent from Type I and Type II gases, while opening the cryopumping array to improve conductance to the adsorbent for rapid collection of Type III gases by the adsorbent. The disclosed embodiments provide a high conductance frontal array, a radiation shield shaped to focus gases toward the second stage cryopanel and an open second stage cryopanel architecture, though implementation of the invention need not include all of these features.

The invention enables a cryopump having at least 20% capture probability of hydrogen, preferably over 25%. Disclosed embodiments have a capture probability greater than 30%. The cryopump comprises a refrigerator having first and second stages. A second stage cryopanel in thermal contact with the second stage of the refrigerator condenses low temperature condensing gases. A radiation shield surrounds the second stage cryopanel and is in thermal contact with the first stage of the refrigerator. A frontal cryopanel across an opening in the radiation shield serves as a radiation shield for the second stage cryopanel and as a cryopumping surface for higher condensing temperature gases. The second stage cryopanel comprises an array of baffles carrying an adsorbent, at least about 80% of the adsorbent having a direct line of sight to the radiation shield or to the opening in the radiation shield. More preferably at least 90% of the adsorbent is so exposed, and most preferably, substantially all of the adsorbent is so exposed. Preferably, the majority of the adsorbent is exposed to the cylindrical sides of the radiation shield or to the frontal opening. In certain embodiments, at least about 90% of the surface area of the second stage cryopanel is coated with adsorbent.

The frontal cryopanel may cover an area greater than a projection of the second stage cryopanel but less than 50% of the opening in the radiation shield. The diameter of the second stage cryopanel is preferably less than 60% of the diameter of the opening in the radiation shield.

The radiation shield may comprise a cylinder and a base closing an end of the cylinder, a junction of the cylinder and base being curved to focus gases toward the second stage cryopanel.

The second stage cryopanel may comprise flat baffles having edges directed toward the radiation shield. Frontal baffles angled outwardly and toward the opening of the radiation shield define an envelope extending toward the opening of the radiation shield, the envelope having a sloped periphery. Rear baffles may be angled outwardly and away from the opening in the radiation shield, the edges of the rear baffles defining an envelope extending away from the opening of the radiation shield, the envelope having a sloped periphery. In one embodiment, the frontal and rear baffles are fanned discs. In another embodiment, the frontal and rear baffles comprise concentric frustoconical baffles.

In accordance with another aspect of the invention, the second stage cryopanel array comprises an array of discs, the discs fanning to define a generally ball shaped envelope. Specifically, the array may comprise a stack of parallel discs, a fan of discs forming a dome at one end of the stack, and a fan of discs forming an inverted dome at the other end of the stack. The discs may be mounted to a pair of brackets adapted to be mounted to a cryogenic refrigerator heat station.

BRIEF DESCRIPTION OF THE DRAWINGS

The foregoing and other objects, features and advantages of the invention will be apparent from the following more particular description of preferred embodiments of the invention, as illustrated in the accompanying drawings in which like reference characters refer to the same parts throughout the different views. The drawings are not necessarily to scale, emphasis instead being placed upon illustrating the principles of the invention.

DETAILED DESCRIPTION OF THE INVENTION

A description of preferred embodiments of the invention follows.

Figure 1:
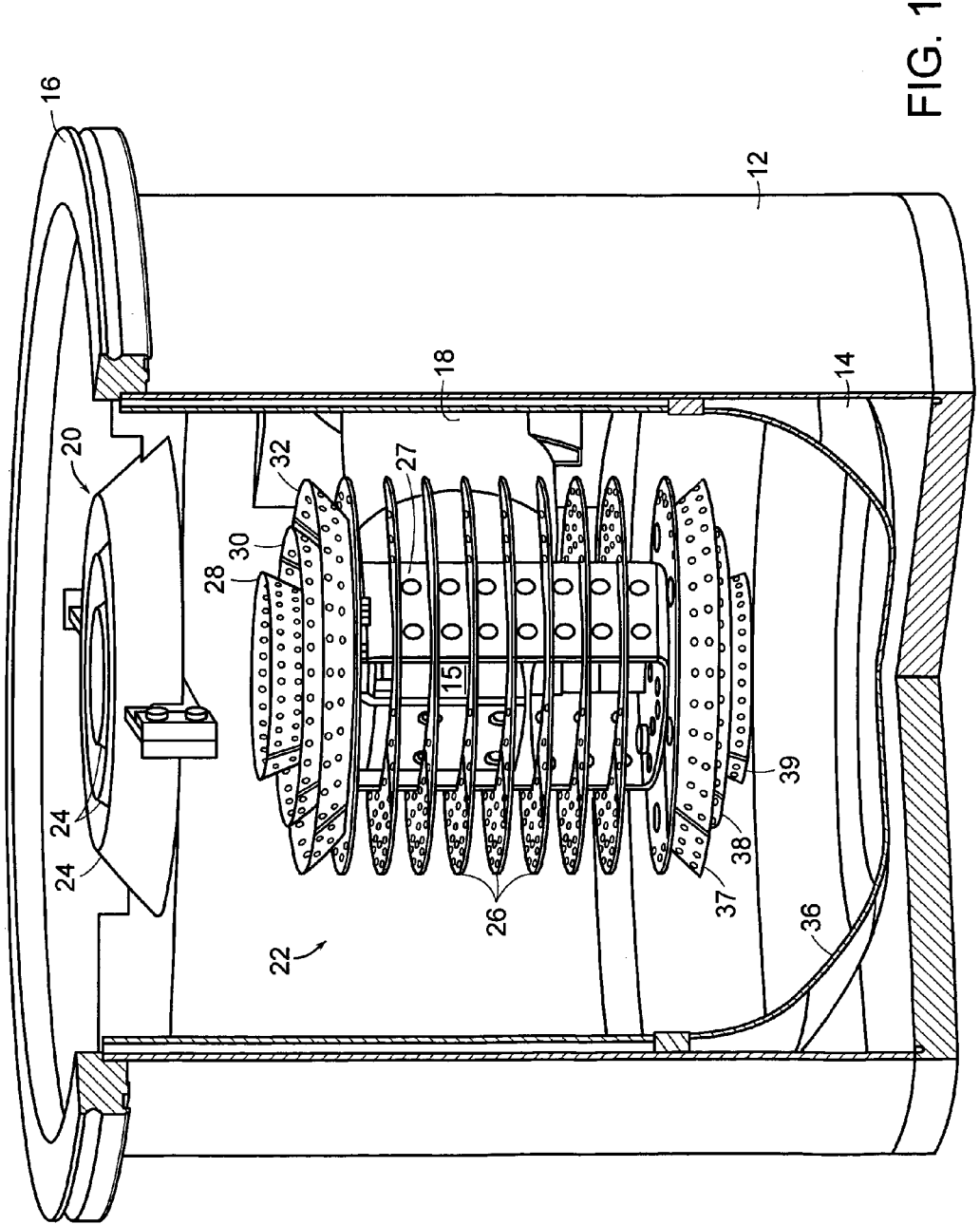
FIG. 1 is a perspective view of a cryopump embodying the present invention, with a vacuum vessel and radiation shield broken away.

FIGS. 1-5 illustrate one embodiment of the invention. FIG. 1 is a perspective view of a cryopump with a vacuum vessel 12 and radiation shield 14 broken away. The vacuum vessel 12 may be mounted directly to a work chamber on flange 16 or to an intermediate gate valve between it and the work chamber. A two-stage cold finger of a cryogenic refrigerator 15 protrudes into the housing through the side opening. In this embodiment, the second stage of the refrigerator is surrounded by a cylinder 18 that shields the second stage of the refrigerator. The cylinder 18 minimizes evaporation and subsequent recondensation of gases on the cold finger with fluctuations in temperature along the cold finger as described U.S. Pat. No. 5,156,007, which is incorporated herein by reference.

The refrigerator includes a displacer in the cold finger which is driven by a motor. Helium gas entering the cold finger is expanded and thus cooled in a manner which produces very cold temperatures. Such a refrigerator is disclosed in U.S. Pat. No. 3,218,815 to Chellis et al., which is incorporated herein by reference.

The cup-shaped radiation shield 14 mounted to the first stage heat sink typically operates between about 65 and 100 degrees Kelvin. The radiation shield surrounds the second stage cryopumping area and minimizes the heating of that area by direct radiation or by higher condensing temperature vapors. The first stage pumping surface comprises a frontal array 20 which serves as both a radiation shield for the second stage pumping area and a cryopumping surface for higher temperature condensing gases such as water vapor. This array allows the passage of lower condensation temperature gases through to the second stage pumping area.

Figure 4:
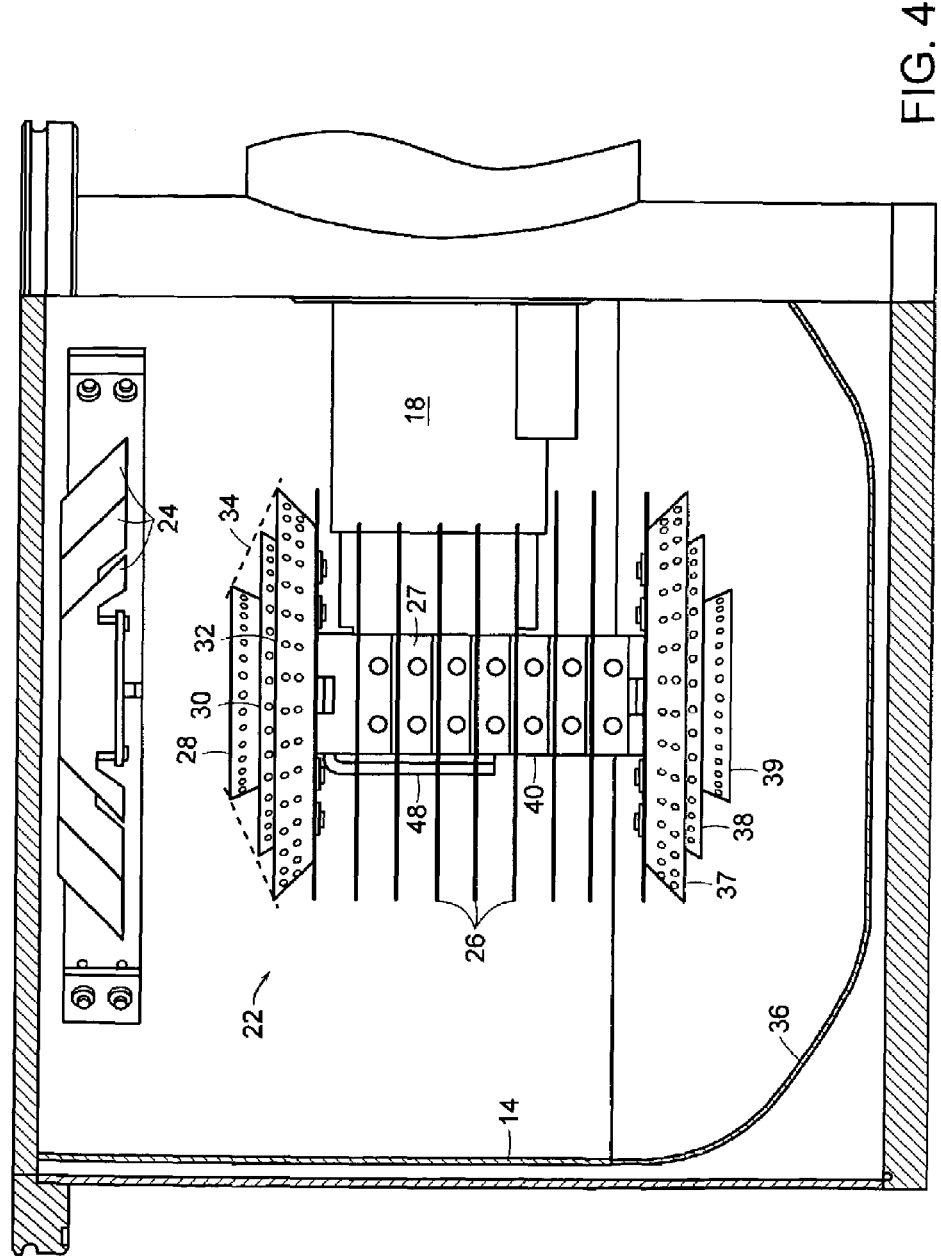
FIG. 4 is a side view of the second stage cryopanel of FIG. 1.
Figure 5:
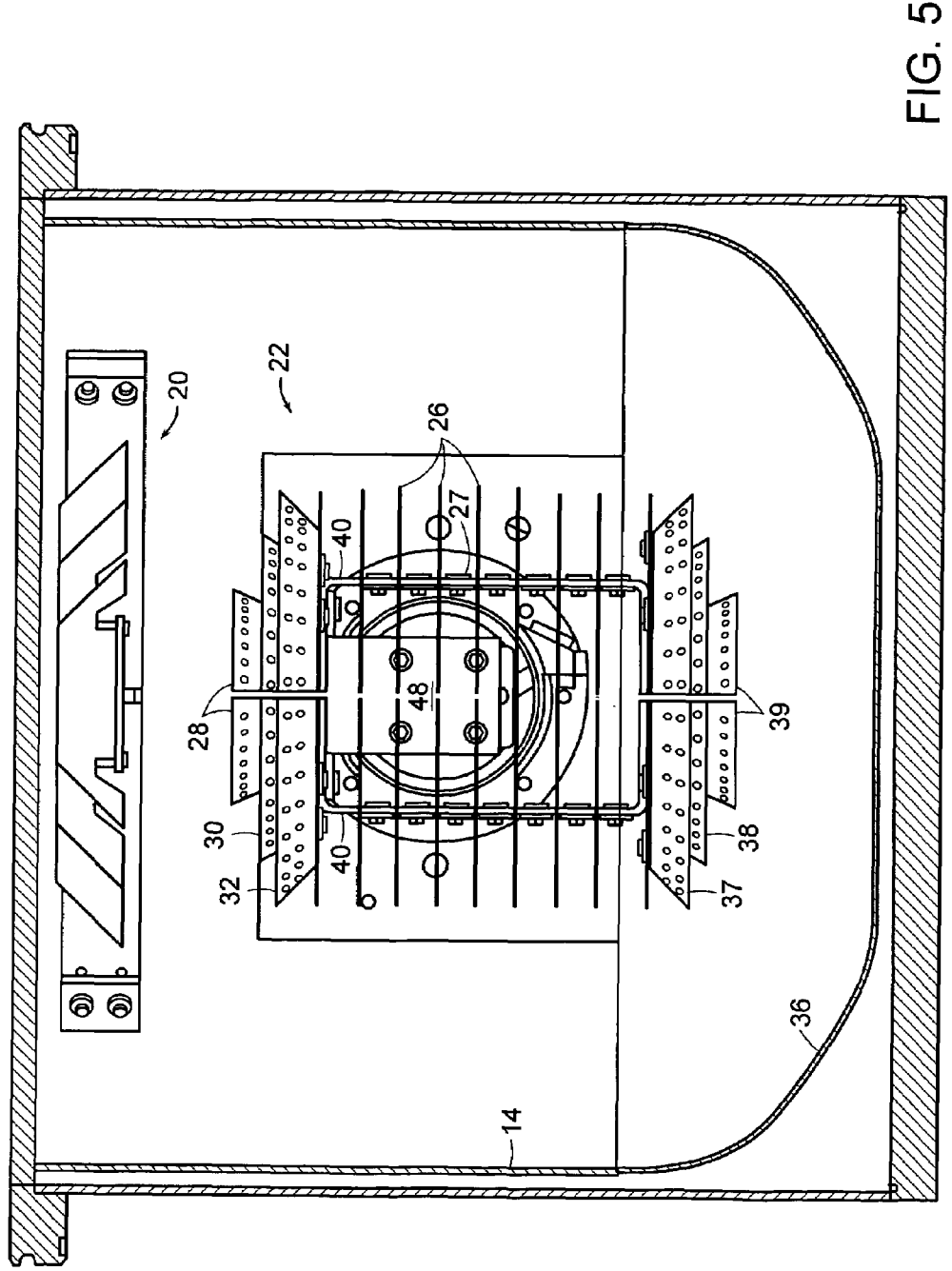
FIG. 5 is a side view of the second stage cryopanel of FIG. 1 oriented 90° relative to FIG. 4.
Figure 6:
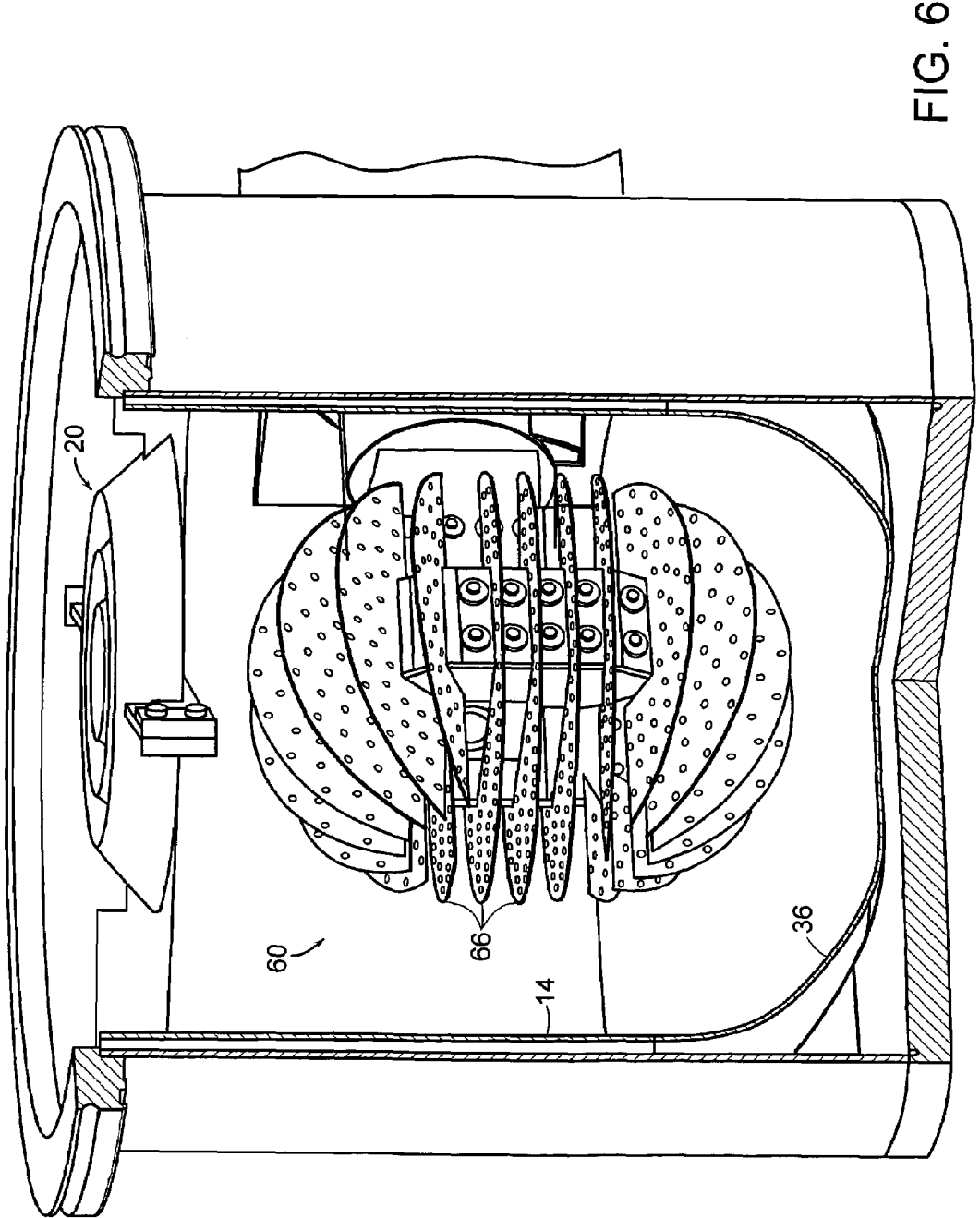
FIG. 6 is a perspective view of an alternative embodiment of the invention.

A typical frontal array extends across the entire opening of the radiation shield and includes chevron-shaped baffles to assure that a large percentage of Type I gases strike the frontal array and are thus condensed on the array before they are able to enter the volume within the radiation shield. By contrast, the frontal array of the disclosed embodiments fully covers the second stage cryopanel array 22 but does not extend to the outer periphery of the radiation shield opening. Preferably, the frontal array covers less than 50% of the opening. In one embodiment in which the radiation shield has a diameter of 304 mm, the frontal array is only 165 mm in diameter such that it covers less than one-third of the area of the opening. In that embodiment, the second stage array has a diameter of 134 mm. As illustrated in FIG. 4, the frontal array only uses three frustoconical shaped baffles 24, and no chevrons. The reduced area and open design of the frontal array increases the probability that a gas molecule will enter the volume within the radiation shield and thus be captured, for increased pumping speed, at a cost of increased heat load on the refrigerator. However, with a reduced diameter second stage array the frontal array covers an area greater than a projection of that array to avoid an excessive increase in heat load.

Contrary to conventional designs, the second stage cryopanel 22 has a very open architecture. Specifically, it is formed of a stack of spaced flat discs 26 which carry adsorbent on both surfaces. Holes are formed in the discs to facilitate bonding of adhesive to the surfaces of the discs for holding adsorbent on those surfaces.

Frontal baffles 28, 30 and 32 are frustoconical in shape, and they are also coated with adsorbent. In the illustrated embodiment, each of those baffles forms a different angle, but all are pointed outwardly and toward the opening of the radiation shield. As illustrated in FIG. 4 by the broken lines 34, the frustoconical baffles define an envelope that points toward the opening of the radiation shield but is sloped from the periphery. The slope in the frontal array envelope minimizes direct contact of gases which have passed between the frontal baffles 24 such that the gases are likely to first intersect the radiation shield 14, which condenses Type I gases. Rear frustoconical baffles 37, 38 and 39 provide additional adsorbent coated surface area for capturing Type III gases.

The many baffles of the array, coated on substantially all surfaces with adsorbent, provide for a large capacity for Type III gases. Contrary to prior designs which would block the line of sight from the radiation shield to much of the adsorbent, substantially all of the adsorbent on the discs 26, frontal baffles 28, 30 and 32 and rear baffles 37, 38 and 39, is exposed to a direct line of sight from the radiation shield or frontal opening in the radiation shield. The majority of the surfaces are exposed to the cylinder sides of the radiation shield or the cylindrical frontal opening. Moreover, as illustrated in FIG. 4. at least some of the surfaces of each of the discs 26, frontal baffles 28, 30, 32 and rear baffle 37 have a direct line of sight through the opening in the radiation shield 14 without intersecting the frontal cryopanel baffles 24. This exposure subjects the adsorbent to greater heat load and to exposure to Type I and Type II gases, but substantially increases the speed of the pumping of the Type III gases.

It can be seen in FIG. 4 that the second stage cryopanel array 22 has a diameter which is substantially less than that of the radiation shield. In one embodiment, the diameter of the array is 134 mm, while the diameter of the radiation shield is 304 mm. As a result, there is a large open volume between the two which provides for high conductance of gases to the second stage cryopanel even as Type I gases collect on the surface of the radiation shield. In general, it is preferred that the second stage cryopanel have a diameter less than 60% of the diameter of the radiation shield.

With the open space between the cryopanel and the radiation shield, a significant amount of gas can be expected to reach the closed base of the radiation shield. Gas molecules in low pressure environments travel along straight paths and, as they hit a surface, are most likely to be re-emitted from the surface according to the cosine law. In the illustrated embodiment, the junction 36 of the cylinder of radiation shield 14 and the closed base is curved in order to focus gases, which strike that junction but which are not condensed on the radiation shield, toward the second stage cryopanel. Thus, Type I gases are expected to be condensed, but Type II and Type III gases are directed toward the second stage cryopanel for prompt condensation or adsorption on the second stage. Preferably the curved portion extends to about the perimeter of the cryopanel array.

Figure 2:
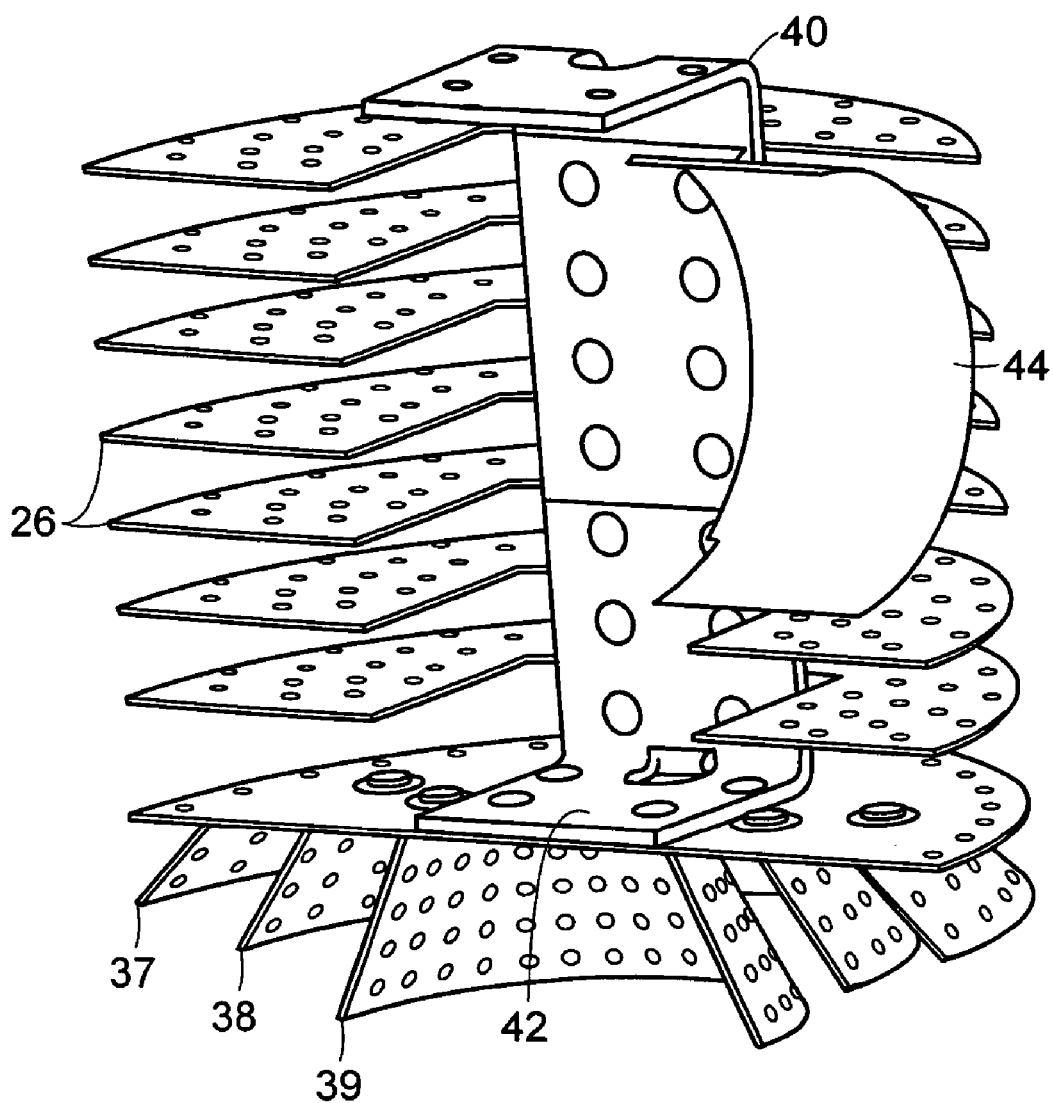
FIG. 2 is a perspective view of a portion of the second stage cryopanel of the embodiment of FIG. 1.

The second stage cryopanel array is formed in two assemblies, one of which is illustrated in FIG. 2. Each horizontal disc of the array is actually formed of two half discs, one on each assembly, and each half disc will hereinafter be referred to as a disc. Each disc is formed of sheet metal with a tab 27 (FIG. 1, 4 and 5) bent from its center. That tab butts against a bracket 40 and is riveted to the bracket. The lower array of frustoconical baffles 37, 38 and 39 are mounted to a lower horizontal portion 42 of the bracket 40. A half cylinder 44 mounted to the bracket is seated within but spaced from the shielding cylinder 18 to complete the shield to the second stage of the cryogenic refrigerator.

The illustrated embodiment includes an optional set of rear baffles 37, 38 and 39 which are directed outwardly and downwardly toward the base of the radiation shield, and specifically toward the curved junction of the cylindrical sides and flat base of the radiation shield. Those baffles readily collect gases directed from the lower portions of the radiation shield.

Figure 3:
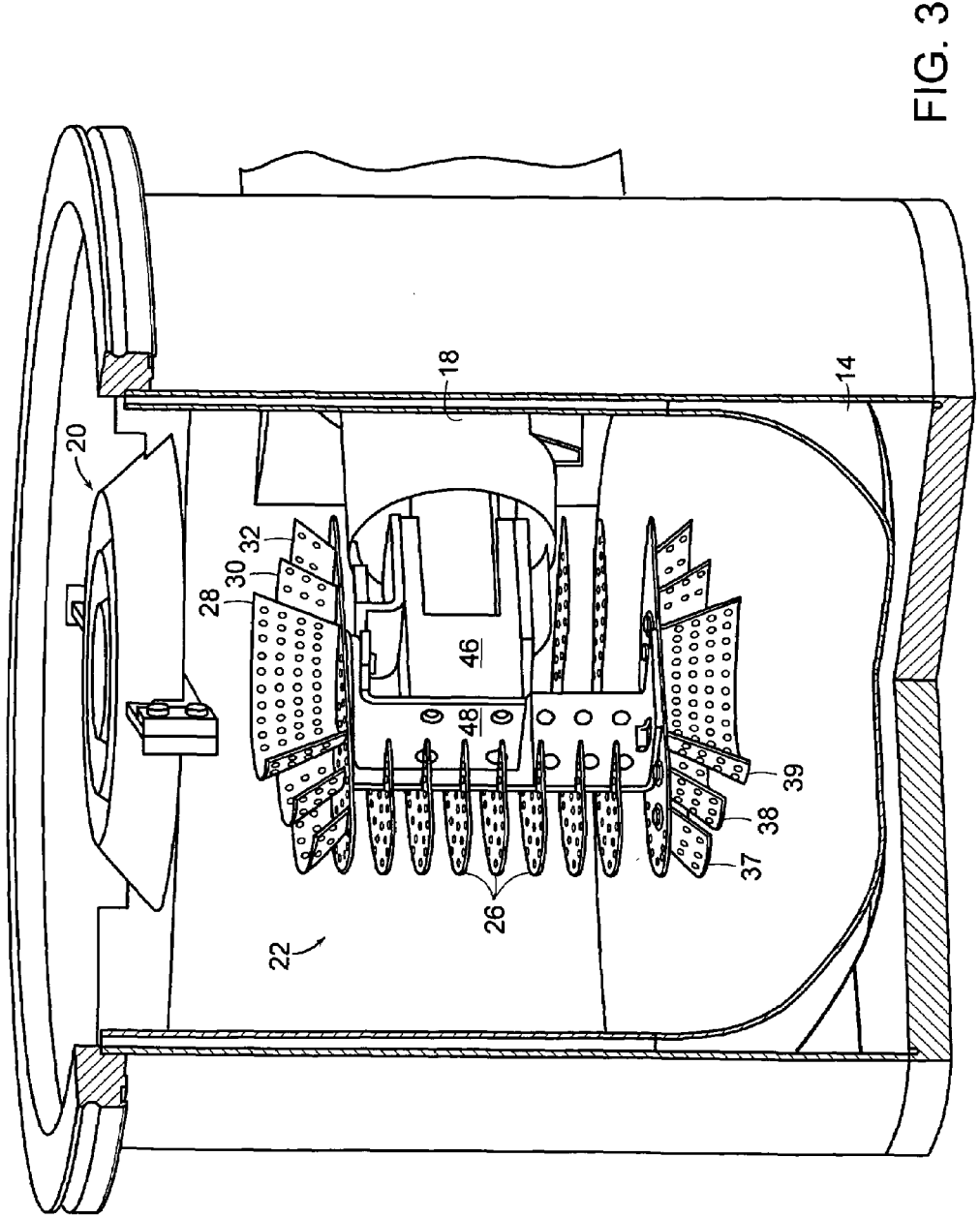
FIG. 3 is a perspective view as presented in FIG. 1 but with half of the second stage cryopanel assembly removed.

In assembly, the assembly of FIG. 2 is mounted to a heat station 46 on the end of the second stage of the cryogenic refrigerator through an additional bracket 48 mounted to the end of the heat station as illustrated in FIG. 3. The frontal frustoconical baffles are then also screwed to that bracket 48.

Figure 7:
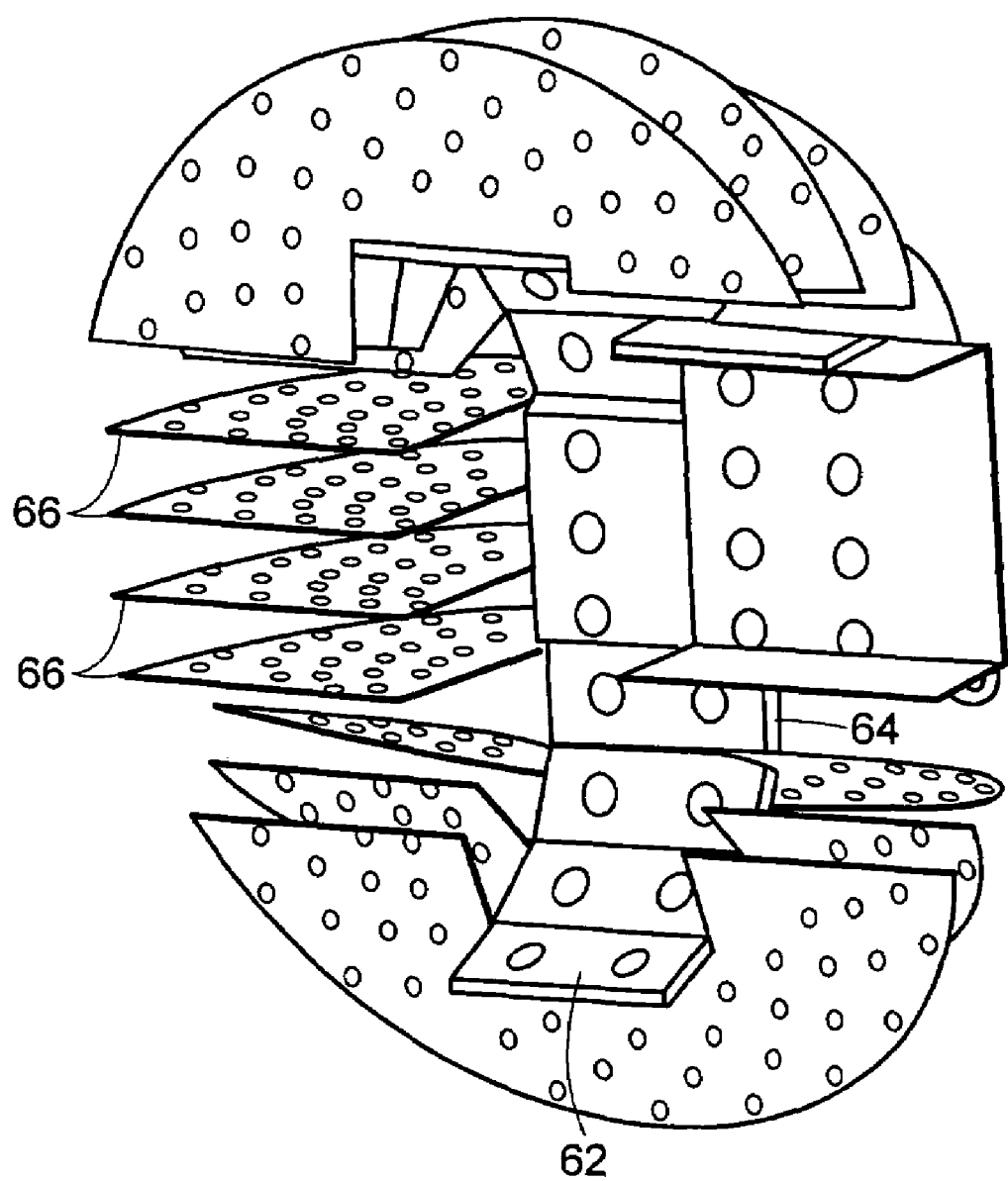
FIG. 7 is a perspective view of a half of the second stage cryopanel array of FIG. 6 prior to mounting to the cryopump.
Figure 8:
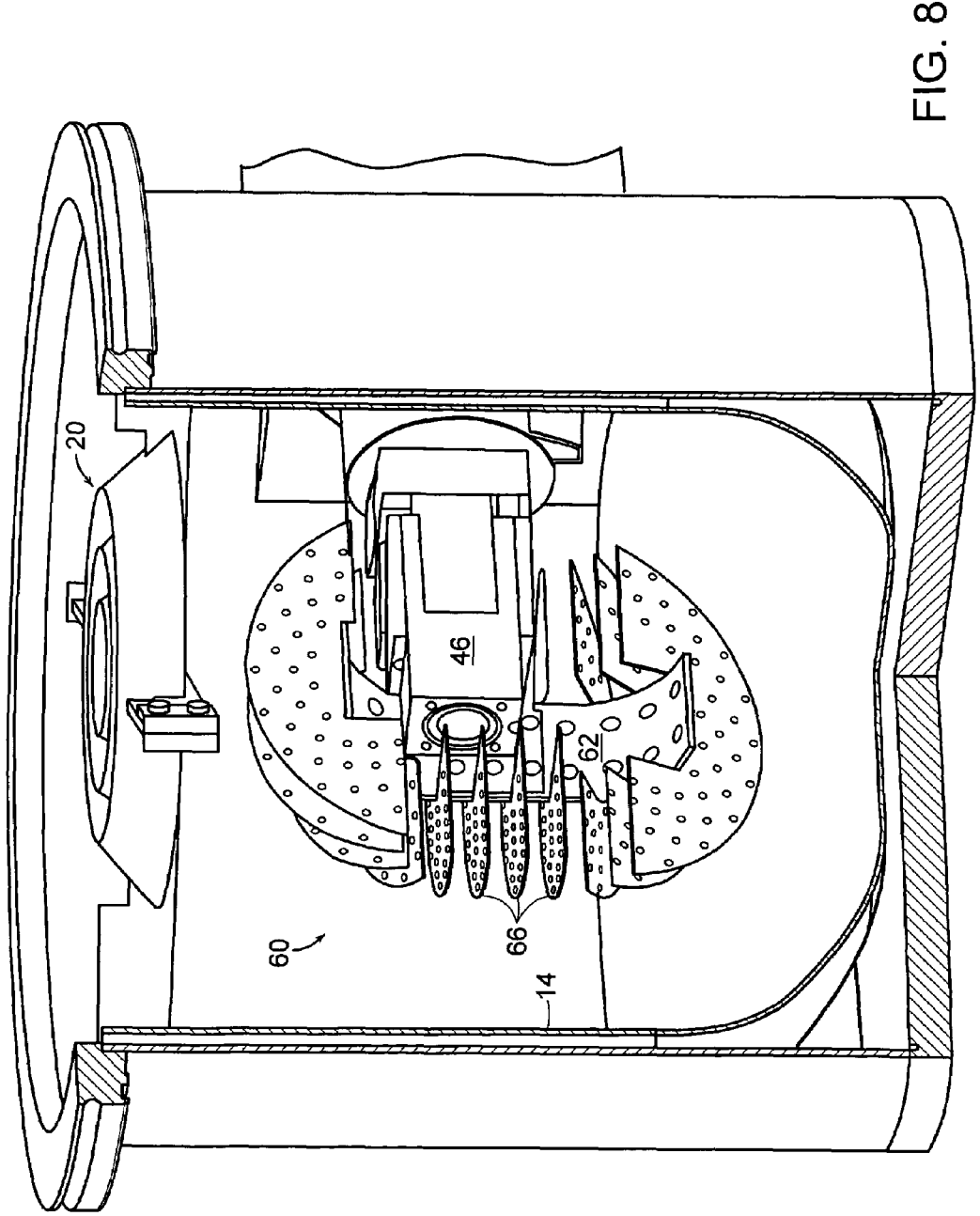
FIG. 8 is a perspective view of the half of the array of FIG. 7 mounted to the cryopump.
Figure 9:
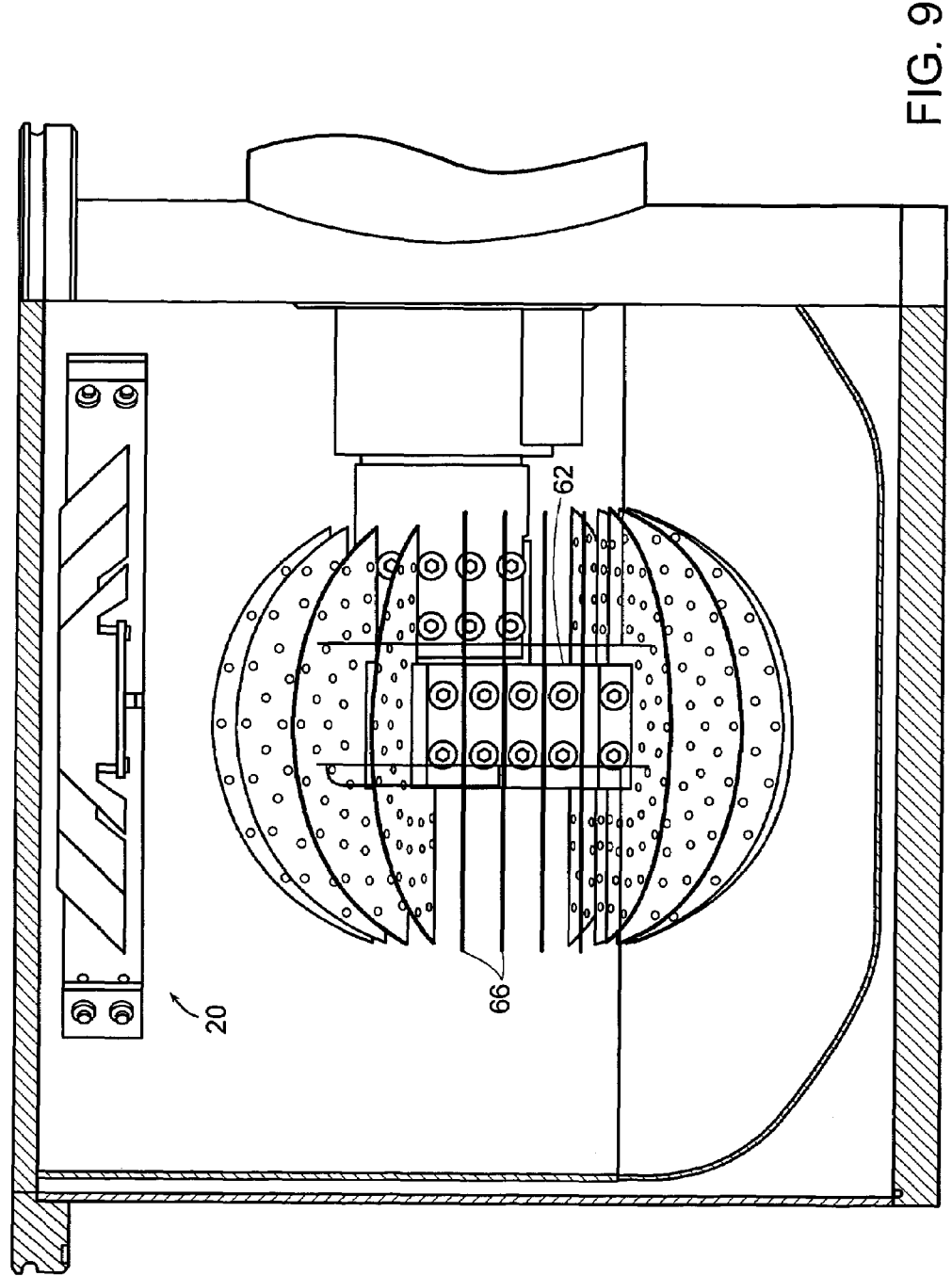
FIG. 9 is a side view of the second stage cryopanel of the embodiment of FIG. 6.

FIGS. 6-10 illustrate another embodiment of the invention. In this embodiment, the radiation shield 14 and frontal cryopanel 20 are similar to those found in the first embodiment. Similarly, the second stage cryopanel has an open design in which flat baffles are covered with adsorbent which is exposed to direct line of sight from the surrounding radiation shield or frontal opening. This embodiment, however, allows for fewer baffle parts and increased surface area. In this embodiment, the array is formed of discs which are fanned to define a generally ball shaped array. This design also relies on two baffle assemblies, one of which is illustrated in FIG. 7. The semi-circular discs are mounted to a bracket 62 having a vertical section 64 and incrementally sloping sections at either end. Four discs 66 are mounted to the vertical portion of the bracket and are thus horizontal. Three discs at each end of the bracket are angled outwardly and toward a respective end of the radiation shield. A final disc is mounted to the top or bottom end of the bracket of a respective assembly and is near vertical. Each of the baffle assembly brackets is mounted to the heat station 46 of the cryogenic refrigerator as illustrated in FIG. 8.

Figure 10:
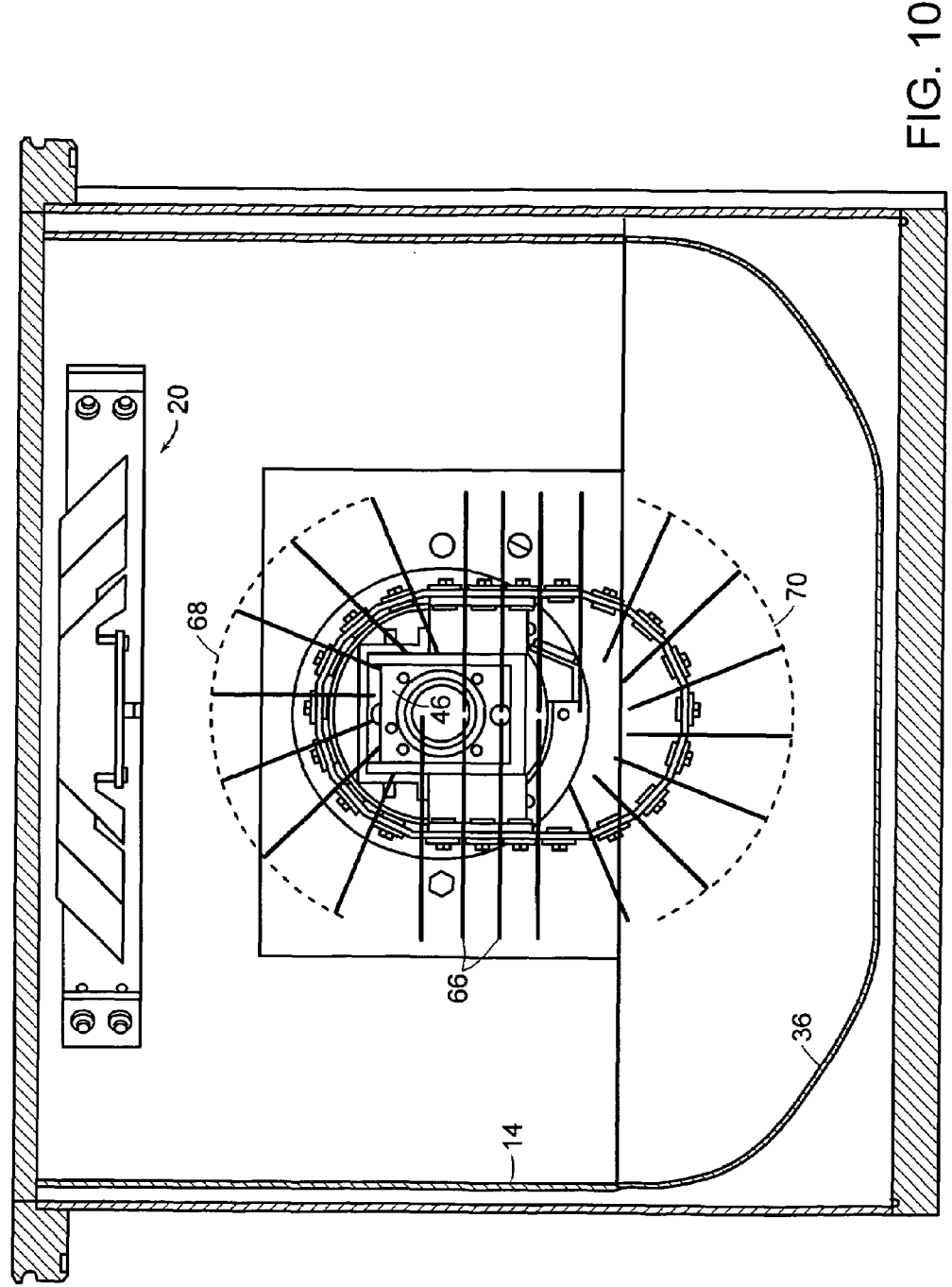
FIG. 10 is a side view of the second stage cryopanel of the embodiment of FIG. 6 oriented 90° relative to FIG. 9.

As illustrated in FIG. 10, the ends of the fanned discs define an envelope which forms a spherical dome 68 toward the frontal opening and an inverted dome 70 toward the base of the radiation shield. As in the first embodiment, this dome shape provides a slope in the envelope which increases surface area but minimizes direct interception of radiation passing between the baffles of the frontal array. As in the first embodiment, the entire surface area of the baffles may be coated in adsorbent to which there is a high level of conductance.

A typical prior art cryopump having a 400 mm diameter has a capture rate at 72° F. of about 12,000 liters per second for hydrogen and a capture probability of hydrogen of about 22%. In an implementation of the first disclosed embodiment, a 320 mm diameter system, that is one having about two-thirds the opening area of the 400 mm system, has a capture rate of about 11,000 liters per second and a capture probability of about 31%. An implementation of the second disclosed embodiment having a 320 mm diameter obtains a capture rate of about 13,000 liters per second and a capture probability of about 37%. As another comparison, a conventional 250 mm system has a capture rate of about 4,500 liters per second with about 21% capture probability of hydrogen. A 250 mm system according to the second embodiment of the invention obtained a 7,000 liter per second capture rate with about 32% capture probability of hydrogen.

While this invention has been particularly shown and described with references to preferred embodiments thereof, it will be understood by those skilled in the art that various changes in form and details may be made therein without departing from the scope of the invention encompassed by the appended claims.

What is claimed is:

1. A cryopump comprising:
a refrigerator having first and second stages;
a second stage cryopanel in thermal contact with the second stage of the refrigerator to condense low temperature condensing gases;
a radiation shield surrounding the second stage cryopanel and in thermal contact with the first stage of the refrigerator; and
a frontal cryopanel across an opening in the radiation shield serving as a cryopumping surface for higher condensing temperature gases;
the cryopump having at least a 20% capture probability of hydrogen, and the second stage cryopanel comprising an array of baffles carrying an adsorbent, at least about 80% of the adsorbent having a direct line of sight to the radiation shield or to the opening in the radiation shield, and at least some of the adsorbent having a direct line of sight through the opening in the radiation shield.

2. A cryopump as claimed in claim 1 wherein at least about 90% of the surface area of the second stage cryopanel is coated with adsorbent.

3. A cryopump as claimed in claim 1 wherein the second stage cryopanel comprises flat baffles having edges directed toward the radiation shield.

4. A cryopump as claimed in claim 3 wherein the second stage cryopanel further comprises frontal baffles angled outwardly and toward the opening in the radiation shield.

5. A cryopump as claimed in claim 4 wherein the edges of the frontal baffles define an envelope extending toward the opening of the radiation shield, the envelope having a sloped periphery.

6. A cryopump as claimed in claim 5 wherein the frontal baffles are fanned discs.

7. A cryopump as claimed in claim 5, wherein the frontal baffles comprise concentric frustoconical baffles.

8. A cryopump as claimed in claim 5 further comprising rear baffles angled outwardly and away from the opening of the radiation shield, the edges of the rear baffles defining an envelope extending away from the opening of the radiation shield, the envelope having a sloped periphery.

9. A cryopump as claimed in claim 1 wherein the radiation shield comprises sides and a base closing an end of the sides, a junction of the sides and base being sloped to focus gases toward the second stage cryopanel.

10. A cryopump as claimed in claim 9 wherein the second stage cryopanel further comprises rear baffles angled outwardly and away from the opening of the radiation shield.

11. A cryopump comprising:
a refrigerator having first and second stages;
a second stage cryopanel in thermal contact with the second stage of the refrigerator to condense low temperature condensing gases;
a radiation shield surrounding the second stage cryopanel and in thermal contact with the first stage of the refrigerator; and
a frontal cryopanel across an opening in the radiation shield serving as a cryopumping surface for higher condensing temperature gases;
the cryopump having at least a 20% capture probability of hydrogen, and the second stage cryopanel comprising an array of baffles carrying an adsorbent, at least about 80% of the adsorbent having a direct line of sight to the radiation shield or to the opening in the radiation shield;
wherein the radiation shield comprises sides and a base closing an end of the sides, a junction of the sides and base being sloped to focus gases toward the second stage cryopanel;
wherein the second stage cryopanel further comprises rear baffles angled outwardly and away from the opening of the radiation shield;
wherein the edges of the rear baffles define an envelope which is sloped along its periphery.

12. A cryopump as claimed in claim 1 wherein the frontal cryopanel coversan area greater than a projection of the second stage cryopanel but less than 50% of the opening in the radiation shield.

13. A cryopump as claimed in claim 1 wherein the diameter of the second stage cryopanel is less than 60% of the diameter of the opening in the radiation shield.

14. A cryopump as claimed in claim 1 wherein when the second stage cryopanel comprises an array of discs, the discs fanning to define a generally ball shaped envelope.

15. A cryopump comprising:
a refrigerator having first and second stages;
a second stage cryopanel in thermal contact with the second stage of the refrigerator to condense low temperature condensing gases;
a radiation shield surrounding the second stage cryopanel and in thermal contact with the first stage of the refrigerator; and
a frontal cryopanel across an opening in the radiation shield serving as a cryopumping surface for higher condensing temperature gases;
the cryopump having at least a 20% capture probability of hydrogen, and the second stage cryopanel comprising an array of baffles carrying an adsorbent, at least about 80% of the adsorbent having a direct line of sight to the radiation shield or to the opening in the radiation shield;
wherein when the second stage cryopanel comprises an array of discs, the discs fanning to define a generally ball shaped envelope;
wherein the ball shaped envelope comprises a stack of parallel discs, a fan of discs forming a dome at one end of the stack and a fan of discs forming an inverted dome at the other end of the stack.

16. A cryopump as claimed in claim 1 wherein at least 90% of the adsorbent has a direct line of sight to the radiation shield or to the opening in radiation shield.

17. A cryopump as claimed in claim 1 wherein substantially all of the adsorbent has a direct line of sight to the radiation shield or to the opening in radiation shield.

18. A cryopump as claimed in claim 1 wherein the cryopump has at least a 25% capture probability of hydrogen.

19. A cryopump as claimed in claim 1 wherein the cryopump has at least a 30% capture probability of hydrogen.

20. A cryopump comprising:
a refrigerator having first and second stages;
a second stage cryopanel in thermal contact with the second stage of the refrigerator to condense low temperature condensing gases;
a radiation shield surrounding the second stage cryopanel and in thermal contact with the first stage of the refrigerator; and a frontal cryopanel across a frontal opening in the radiation shield serving as a cryopumping surface for higher condensing temperature gases;

the second stage cryopanel comprising an array of baffles carrying an adsorbent, including baffles extending toward the frontal opening, at least about 80% of the adsorbent having a direct line of sight to the radiation shield or to the opening in the radiation shield, and at least some of the adsorbent having a direct line of sight through the opening in the radiation shield;

wherein the cryopump has at least a 25% capture probability of hydrogen.

21. A cryopump comprising:

a refrigerator having first and second stages;

a second stage cryopanel in thermal contact with the second stage of the refrigerator to condense low temperature condensing gases;

a radiation shield surrounding the second stage cryopanel and in thermal contact with the first stage of the refrigerator; and a frontal cryopanel across a frontal opening in the radiation shield serving as a cryopumping surface for higher condensing temperature gases;

the second stage cryopanel comprising an array of baffles carrying an adsorbent, including baffles extending toward the frontal opening, at least about 80% of the adsorbent having a direct line of sight to the radiation shield or to the opening in the radiation shield, and at least some of the adsorbent having a direct line of sight through the opening in the radiation shield;

wherein the cryopump has at least a 30% capture probability of hydrogen.

22. A cryopanel array comprising an array of discs, the discs fanning to define a generally ball shaped envelope, wherein the array of discs includes a fan of discs forming a dome at one end of the envelope and a fan of discs forming an inverted dome at the other end of the envelope.

23. A cryopanel array as claimed in claim 22 comprising: a stack of parallel discs;

24. A cryopanel array as claimed in claim 23 wherein the discs are mounted to a pair of brackets adapted to be mounted to a cryogenic refrigerator heat station.

25. A cryopump comprising:

a refrigerator having first and second stages;

a second stage cryopanel in thermal contact with the second stage of the refrigerator to condense low temperature condensing gases, the second stage cryopanel comprising an array of discs, the discs fanning to define a generally ball shaped envelope;

a radiation shield surrounding the second stage cryopanel and in thermal contact with a first stage heat sink; and a frontal cryopanel across an opening in the radiation shield serving as a cryopumping surface for higher condensing temperature gases;

wherein the second stage cryopanel comprises:

a stack of parallel discs;

a fan of discs forming a dome at one end of the stack; and a fan of discs forming an inverted dome at the other end of the stack.

26. A cryopump as comprising:

a refrigerator having first and second stages;

a second stage cryopanel in thermal contact with the second stage of the refrigerator to condense lower temperature condensing gases; and a radiation shield surrounding the second stage cryopanel and in thermal contact with the first stage of the refrigerator, the radiation shield comprising sides and a base closing an end of the sides, a junction of the sides and base being sloped to focus gases toward the second stage cryopanel;

a frontal cryopanel across an opening in the radiation shield serving as a cryopumping surface for higher condensing temperature gases, the frontal cryopanel covering an area greater than a projection of the second stage cryopanel but less than 50% of the opening in the radiation shield; and rear baffles angled outwardly and away from the opening of the radiation shield, the rear baffles defining an envelope which is sloped along its periphery;

the second stage cryopanel comprising:

an array of flat baffles having edges directed toward the radiation shield; and frontal baffles angled outwardly and toward the opening in the radiation shield, the edges of the frontal baffles defining an envelope extending toward the opening of the radiation shield, the envelope having a sloped periphery;

baffles of the second stage cryopanel carrying an adsorbent, at least about 80% of the adsorbent having a direct line of sight to the radiation shield or to the opening in the radiation shield.

* * * * *